Oct. 16, 1928.
A. N. WHITE
1,687,913
AUTOMATIC BRAKING DEVICE FOR AUTOMOBILES
Filed May 19, 1925
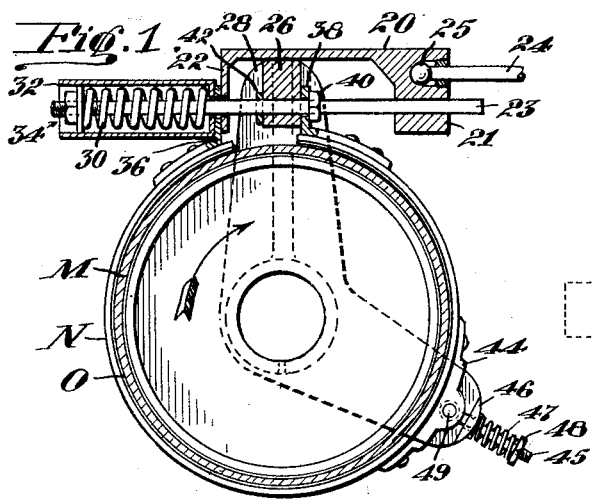
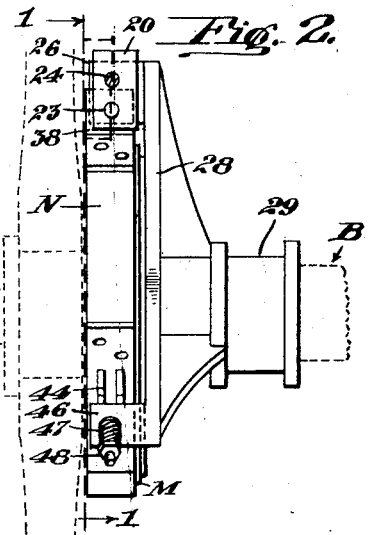
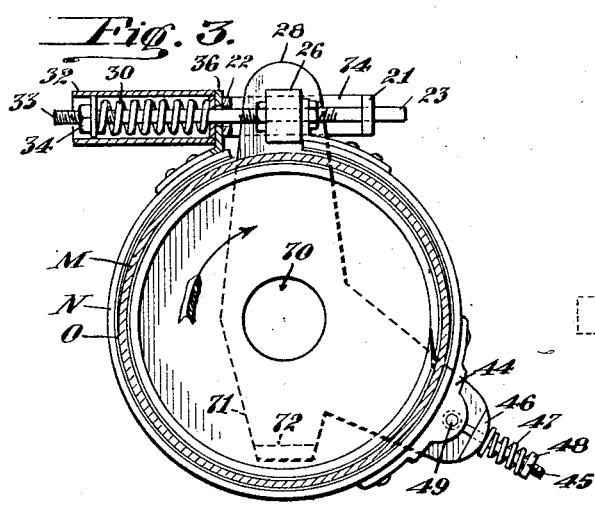
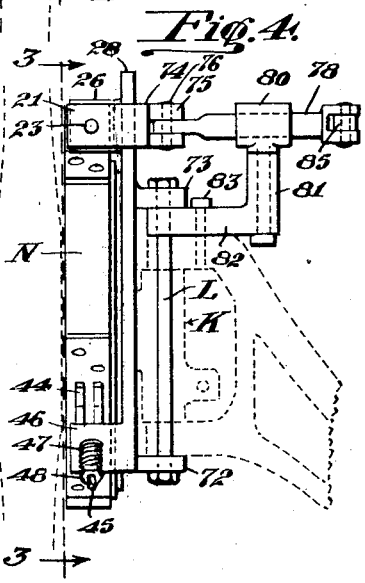
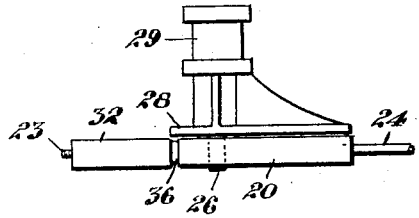
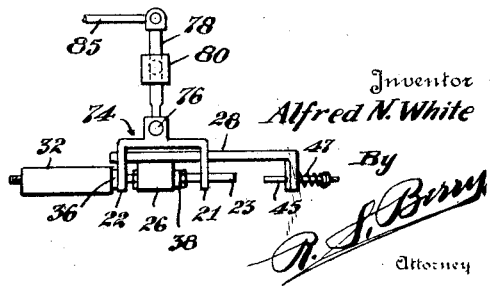
Inventor
Alfred N. White
By
R. S. Berry
Attorney Patented Oct. 16, 1928.

1,687,913

UNITED STATES PATENT OFFICE.

ALFRED N. WHITE, OF LOS ANGELES, CALIFORNIA.

AUTOMATIC BRAKING DEVICE FOR AUTOMOBILES.

Application filed May 19, 1925. Serial No. 31,301.

This invention relates to brakes particularly adapted for use upon automobiles and similar vehicles and which are serviceable especially as foot brakes.

An object of the invention is to provide a braking device for effecting uniform braking action from the minimum to the maximum pressure upon the wheels of a vehicle and which is adapted for use on both the front and rear wheels or upon either the front or rear wheels.

Another object is to provide a braking structure of the character stated which shall be tensioned normally and require merely to be released for braking operation.

Another object is the provision of a braking structure wherein the braking pressure itself will by improved means be automatically applied.

Briefly, the invention resides in an arm or analogous part adapted to be connected with the relatively stationary portion of the vehicle adjacent the respective wheel, to which arm there is secured one end of a brake band positioned about the brake drum on the wheel, while the opposite end of the brake band is actuable by means of a spring which is tensioned normally and is held in tensioned or retracted position when the wheel is released for travel. The spring is held in such retracted position by means of a movable member which is adapted to be readily operated to effect release of said spring, whereby said spring moves the movable end of the brake band and brings the same into engagement with the brake drum for braking the wheel. The spring is adapted to actuate the trailing end of the brake band so that the braking action takes place in the direction in which the wheel rotates to thereby assist the braking action. When the spring is retracted and the brake band released, the spring actuating member is engageable with any well known means (not shown) for holding the same in retracted position.

In the drawings wherein certain embodiments are shown by way of example:

Fig. 1 is an enlarged sectional detail of the rear right braking device taken on the line 1—1 of Fig. 2;

Fig. 2 is a front elevation thereof;

Fig. 3 is a sectional detail taken on the line 3—3 of Fig. 4 showing the braking device for the right front wheel;

Fig. 4 is a front elevation thereof;

Fig. 5 is a plan view of the rear braking structure of Fig. 1 with parts removed; and Fig. 6 is a plan view of the front braking structure of Fig. 2 with parts removed.

Referring in detail to the drawings, B represents an axle housing and K a steering knuckle. The wheel is indicated as including the usual braking drum M carried by the hub and spokes upon which the tire rim is supported. About the drum M there is positioned a brake band N provided with a brake lining O. The structure for operating the brakes of each wheel is here shown as including a sliding member or block 20 the opposite ends 21 and 22 of which are slidably carried upon a fixed guide bar 23, said block 20 being actuated through the medium of a reciprocating thrust rod 24 connected therewith as by means of a ball and socket joint 25. The guide bar 23 is secured in a lug 26 carried by and preferably integral with a stationary arm 28 carried on a split sleeve 29 by means of which said arm 28 is secured upon the rear axle housing B. The rear end of the guide bar 23 has a coil spring 30 positioned thereupon which spring is received within a reciprocable housing 32, the forward end of the spring engaging the forward end of said housing while the rear end of said spring engages and is held against movement by a nut and washer secured upon the rear end of the bar 23 as indicated at 34. The movable or trailing end of the brake band N has secured thereto an ear 36 which is positioned between the forward end of the housing 32 and the rear end 22 of the sliding block 20, while the opposite end of the brake band has an ear 38 secured thereto, said ear 38 being secured against a lug 26 of the arm 28 as by means of a nut 40 or the like which cooperates with similar means 42 at the opposite side of the lug 26 for anchoring both the bar 23 and the ear 38 of said lug 26. In this manner only the trailing end of the brake band N which carries the ear 36 will be movable, the spacing of said band and its lining O from the brake drum being accomplished through movement imparted by said spring 30. In order to insure withdrawal of the intermediate portion and the rear portion of said brake band from engagement with the drum M, said band is provided with a lug 44 with which there is movably connected a stem 45 which projects through a laterally disposed ear 46 on the lowermost end of the arm 28, said stem being actuable under influence of a spring 47 whose outer end abuts against a nut 48 screwed on the stem 45 and whose inner end bears against the part 46. Thus when the block 20 is forced rearwardly by the rod 24 to compress and retract the spring 30 and to move the ear 36 on the brake band N rearwardly, the spring 47 will insure proper spacing of the intermediate portions and the rear portion of the brake band from the drum, sufficient play in the mounting of the stem 45 being provided to care for the necessary lateral movements, any suitable connection such as a pin 49 being provided for connecting said stem 45 with the lug 44.

The rod 24 which actuates the block 20, is reciprocated through the medium of any suitable operating device whereby the spring 30 may be held in a retracted position when it is desired to retain the brake in its released position.

In this case as shown in Fig. 3, the arm 28 is apertured to fit snugly upon the wheel spindle as indicated at 70, said arm 28 having a portion 71 depending below the spindle which is provided with a laterally disposed lug 72 adapted to fit under the yoke in the front axle, while the upper portion of the arm 28 is provided with a second laterally disposed lug 73 adapted to be disposed above the yoke of the front axle, both of said lugs 72 and 73 receiving and being positioned by the king bolt L. A slide block 74 which corresponds with the block 20 and slides along the bar 23 to actuate the spring 30, is provided with a laterally extending portion 75 which overhangs the king bolt L and has a pivotal connection 76 with a lever 78, the pivoting center of said connection 76 being in exact vertical alignment with the axis of the king bolt L upon which the front wheel pivots. The lever 78 passes through a bearing 80 which is swiveled in a vertically disposed guide 81 carried on a bracket 82 secured to the yoke of the front axle F and positioned between said yoke and the upper lug 73 of the arm 28. The lever 78 which is slidable in the bearing 80 is adapted to be oscillated upon the swivel 81 by means of an operating or thrust rod 85 actuated through an arm 86 on a rocker shaft 88, which in turn is actuated through a depending oscillating arm 89 movable by a draw bar 90 connected with the ear 92 on the lever 56 which is actuated by the pedal arm 58.

From the foregoing it will be seen that when thrust rod 85 is moved forward to actuate the slide block 74 said slide block is thereby moved rearward against the tension of the respective spring 30 and carries with it the ear 36 on the brake band 15 for releasing the brake.

A great advantage of the present invention resides in the fact that it eliminates any possibility of accidental release of the brakes on grades or other dangerous places, as the brakes are adapted to be automatically applied. Also it eliminates the necessity for an emergency brake. It should be noted that the brakes are at all times under the tension of the springs 30 which prevent all rattle. The springs themselves may be packed in grease which eliminates rattle or squeak of these.

The invention may be applied to both the front and rear wheels of an automobile or it may be employed solely on the rear wheels, and may be employed on any type of vehicle where it is desirable to effect automatic application of the brakes. Furthermore, while, I have herein set forth a specific embodiment of the invention it is to be understood that I do not limit myself to the exact details of construction and the arrangement shown but may employ such changes and modifications as come within the scope of the appended claims.

I claim:—

1. An automatic braking device for automobiles comprising an arm carried by the automobile, a lug on said arm, a guide bar adjustably carried by said lug, a block slidably carried on said guide bar, a thrust rod connected with said slide block, a brake band having its one end secured to said lug and its other end engageable by said block, a spring carried on said guide rod normally tending to exert braking pressure on said band, and means for varying the tension of said spring.

2. An automatic braking device for automobiles comprising in combination a brake drum, a brake band, lugs at the ends of said band, a fixed guide, a guide bar, means for adjustably securing the guide bar and one of said lugs to said guide, a variable tension spring for action upon the other of said lugs, a block for moving said last mentioned lug in opposition to said spring, and a manipulative element for said block.

3. An automatic braking device comprising a brake drum, a brake band, a guide bar, a fixed support for said bar, means for securing one end of the brake band to said guide bar, a spring coiled upon said bar and adapted for action on the other end of the brake band, and means for moving the last mentioned end of the brake band in opposition to said spring.

4. An automatic braking device comprising a brake drum, a brake band, a fixed support, a guide bar fixed to said support, a block having end portions which slidably engage said bar and a recessed intermediate portion within which said fixed support is located, one end of said brake band having an end portion against which an end of said sliding block abuts, a spring coiled around said bar to act upon said band end in opposition to said block, means to move said block in opposition to said spring, and means to maintain stationary the other end of said brake band.

ALFRED N. WHITE.